US010598932B1

(12) United States Patent
Marshall (10) Patent No.: US 10,598,932 B1
(45) Date of Patent: Mar. 24, 2020

(54) HEAD UP DISPLAY FOR INTEGRATING VIEWS OF CONFORMALLY MAPPED SYMBOLS AND A FIXED IMAGE SOURCE

(71) Applicant: Rockwell Collins, Inc., Cedar Rapids, IA (US)

(72) Inventor: Evan S. Marshall, Portland, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 457 days.

(21) Appl. No.: 14/989,539

(22) Filed: Jan. 6, 2016

(51) Int. Cl.
*G02B 27/01* (2006.01)
*G06F 3/01* (2006.01)
*G06T 11/60* (2006.01)

(52) U.S. Cl.
CPC ..... *G02B 27/0172* (2013.01); *G02B 27/0176* (2013.01); *G06F 3/012* (2013.01); *G06F 3/017* (2013.01); *G06T 11/60* (2013.01); *G02B 2027/014* (2013.01); *G02B 2027/0141* (2013.01); *G02B 2027/0165* (2013.01)

(58) Field of Classification Search
None
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |

(Continued)

FOREIGN PATENT DOCUMENTS

| | | |
|---|---|---|
| CN | 200944140 Y | 9/2007 |
| CN | 101881936 A | 11/2010 |

(Continued)

OTHER PUBLICATIONS

U.S. Appl. No. 14/225,062, filed Mar. 25, 2014, Carlo L. Tiana et al.

(Continued)

*Primary Examiner* — Parul H Gupta
(74) *Attorney, Agent, or Firm* — Donna P. Suchy; Daniel M. Barbieri (57) ABSTRACT

A method or system can be used with an aircraft or other vehicle. The system can include or the method can use a head up display for integrating views of conformally mapped symbols and a first image from at least one image source in an environment. The head up display includes a computer and a combiner configured to provide a second image in response to the computer. The second image includes the conformally mapped symbols and a window for viewing the first image on the image source.

20 Claims, 6 Drawing Sheets

(56) References Cited

U.S. PATENT DOCUMENTS

| | | |
|---|---|---|
| 4,775,218 A | 10/1988 | Wood et al. |
| 4,799,765 A | 1/1989 | Ferrer |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,302,964 A * | 4/1994 | Lewins .............. G09G 1/04 345/14 |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,085 A * | 11/1999 | Rallison .............. G02B 27/017 345/8 |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |

(56) References Cited

U.S. PATENT DOCUMENTS

| | | |
|---|---|---|
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B2 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | Dejong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |

(56) References Cited

U.S. PATENT DOCUMENTS

| | | |
|---|---|---|
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1 | 5/2013 | Imanuel |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1 | 9/2014 | Brown et al. |
| 8,913,324 B2 | 12/2014 | Schrader |
| 8,938,141 B2 | 1/2015 | Magnusson |
| 8,964,298 B2 | 2/2015 | Haddick et al. |
| 9,097,890 B2 | 8/2015 | Miller et al. |
| 9,244,280 B1 | 1/2016 | Tiana et al. |
| 9,456,744 B2 | 10/2016 | Popovich et al. |
| 9,523,852 B1 | 12/2016 | Brown et al. |
| 2002/0012064 A1 | 1/2002 | Yamaguchi |
| 2002/0021461 A1 | 2/2002 | Ono et al. |
| 2002/0131175 A1 | 9/2002 | Yagi et al. |
| 2002/0171940 A1* | 11/2002 | He ............... G02B 27/01 359/630 |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0214460 A1* | 11/2003 | Kovacs ............ G02B 26/0833 345/32 |
| 2003/0228019 A1 | 12/2003 | Eichler et al. |
| 2004/0013314 A1* | 1/2004 | Peli ..................... G06T 5/10 382/254 |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0158096 A1* | 7/2008 | Breed ................ B60N 2/002 345/7 |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0284552 A1* | 11/2009 | Larson ............... G02B 27/01 345/632 |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |

(56) References Cited

U.S. PATENT DOCUMENTS

| | | |
|---|---|---|
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1* | 9/2010 | Yahav .................... G02B 27/01 348/115 |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0212398 A1* | 8/2012 | Border .................. G02B 27/017 345/8 |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0088412 A1 | 4/2013 | Helot et al. |
| 2013/0093893 A1 | 4/2013 | Schofield et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1 | 7/2013 | Gadzinski |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1 | 2/2014 | Mason |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0209657 A1 | 7/2016 | Popovich et al. |
| 2018/0295350 A1* | 10/2018 | Liu .......................... G06F 3/01 |

FOREIGN PATENT DOCUMENTS

| | | |
|---|---|---|
| CN | 102057228 | 5/2011 |
| CN | 102822723 | 12/2012 |
| CN | 102866710 | 1/2013 |
| CN | 103620478 | 3/2014 |
| DE | 10 2006 003 785 | 7/2007 |
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2259278 | 8/1975 |
| FR | 2677463 | 12/1992 |
| GB | 2 115 178 A | 9/1983 |
| JP | 2004-157245 | 6/2004 |
| JP | 2006-350129 A | 12/2006 |
| JP | 2007-219106 A | 8/2007 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

U.S. Appl. No. 14/754,368, filed Jun. 29, 2015, Kenneth A. Zimmerman et al.

Amendment and Reply for U.S. Appl. No. 12/571,262, dated Dec. 16, 2011, 7 pages.

Amitai, Y., et al. "Visor-display design based on planar holographic optics," Applied Optics, vol. 34, No. 8, Mar. 10, 1995, pp. 1352-6.

Ayras, et al., "Exit pupil expander with a large field of view based on diffractive optics", Journal of the Society for Information Display, 17/8, 2009, pp. 659-664.

Cameron, A., The Application of Holograhpic Optical Waveguide Technology to Q-Sight Family of Helmet Mounted Displays, Proc. of SPIE, vol. 7326, 7326OH-1, 2009, 11 pages.

(56) References Cited

OTHER PUBLICATIONS

Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/869,866 dated Oct. 3, 2014, 17 pages.
Final Office Action on U.S. Appl. No. 13/250,858 dated Feb. 4, 2015, 18 pages.
Final Office Action on U.S. Appl. No. 13/250,940 dated Oct. 17, 2014, 15 pages.
Final Office Action on U.S. Appl. No. 13/892,026 dated Apr. 3, 2015, 17 pages.
Final Office Action on U.S. Appl. No. 13/892,057 dated Mar. 5, 2015, 21 pages.
Final Office Action on U.S. Appl. No. 14/038,400 dated Aug. 10, 2015, 32 pages.
First office action received in Chinese patent application No. 201380001530.1, dated Jun. 30, 2015, 9 pages with English translation.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 dated Jul. 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 13/250,858 dated Jun. 12, 2015, 20 pages.
Non-Final Office Action on U.S. Appl. No. 13/250,858 dated Sep. 15, 2014, 16 pages.
Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456 dated Apr. 1, 2015, 16 Pages.
Non-Final Office Action on U.S. Appl. No. 13/864,991 dated Oct. 22, 2014, 16 pages.
Non-Final Office Action on U.S. Appl. No. 13/869,866 dated May 28, 2014, 16 pages.
Non-Final Office Action on U.S. Appl. No. 14/038,400 dated Feb. 5, 2015, 18 pages.
Non-Final Office Action on U.S. Appl. No. 14/044,676 dated Apr. 9, 2015, 13 pages.
Non-Final Office Action on U.S. Appl. No. 14/109,551 dated Jul. 14, 2015, 32 pages.
Non-Final Office Action on U.S. Appl. No. 14/152,756, dated Aug. 25, 2015, 39 pages.
Non-Final Office Action on U.S. Appl. No. 14/168,173 dated Jun. 22, 2015, 14 pages.
Non-Final Office Action on U.S. Appl. No. 14/225,062 dated May 21, 2015, 11 pages.
Nordin, G., et al., "Diffraction properties of stratified volume holographic optical elements," Journal of the Optical Society of America A., vol. 9, No. 12, Dec. 1992, pp. 2206-2217, 12 pages.
Notice of Allowance for U.S. Appl. No. 12/700,557, dated Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Notice of Allowance on U.S. Appl. No. 13/355,360 dated Apr. 10, 2014, 7 pages.
Notice of Allowance on U.S. Appl. No. 14/038,400, dated Oct. 30, 2015, 9 pages.
Notice of Allowance on U.S. Appl. No. 14/225,062, dated Dec. 2, 2015, 10 pages.
Office Action for U.S. Appl. No. 12/571,262, dated Sep. 28, 2011, 5 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,621, dated May 21, 2013, 10 pages.
Office Action for U.S. Appl. No. 13/250,858 dated Feb. 19, 2014, 13 pages.
Office Action for U.S. Appl. No. 13/250,858, dated Oct. 28, 2013, 9 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Office Action for U.S. Appl. No. 13/355,360, dated Sep. 12, 2013, 7 pages.
Office Action on U.S. Appl. No. 13/250,940 dated Mar. 25, 2014, 12 pages.
Office Action on U.S. Appl. No. 13/251,087 dated Mar. 28, 2014, 12 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Office Action, USPTO, U.S. Appl. No. 10/696,507, dated Nov. 13, 2008 (CTX-290US), 15 pages.
Plastic has replaced glass in photochromic lens, www.plastemart.com, 2003, 1 page.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 dated Sep. 12, 2014, 23 pages.
Restriction Requirement for U.S. Appl. No. 12/700,557, dated Oct. 17, 2012, 5 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.
U.S. Appl. No. 14/814,020, filed Jul. 30, 2015, Brown et al.
Chinese Office Action issued in corresponding application No. 201310557623, dated Jan. 17, 2017, 10 pages.

(56) References Cited

OTHER PUBLICATIONS

Extended European Search Report for European Application No. 13765610.4 dated Feb. 16, 2016, 6 pages.
Final Office Action on U.S. Appl. No. 13/250,858, dated Jul. 11, 2016, 21 pages.
Final Office Action on U.S. Appl. No. 13/864,991, dated Jun. 27, 2016, 16 pages.
Final Office Action on U.S. Appl. No. 14/044,676, dated Aug. 12, 2016, 23 pages.
Final Office Action on U.S. Appl. No. 14/152,756, dated Oct. 12, 2016, 18 pages.
Final Office Action on U.S. Appl. No. 14/168,173, dated Nov. 4, 2015, 10 pages.
Final Office Action on U.S. Appl. No. 14/260,943, dated Jul. 19, 2016, 23 pages.
Non-final Office Action on U.S. Appl. No. 13/250,858, dated Nov. 14, 2016, 18 pages.
Non-Final Office Action on U.S. Appl. No. 13/844,456, dated Aug. 16, 2016, 18 pages.
Non-Final Office Action on U.S. Appl. No. 13/844,456, dated Dec. 29, 2016, 24 pages.
Non-Final Office Action on U.S. Appl. No. 13/844,456, dated Jan. 15, 2016, 16 Pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 13/892,057, dated May 16, 2016, 23 pages.
Non-Final Office Action on U.S. Appl. No. 14/044,676, dated Dec. 29, 2016, 26 pages.
Non-Final Office Action on U.S. Appl. No. 14/044,676, dated Jan. 20, 2016, 21 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 14/465,763, dated Sep. 29, 2016, 4 pages.
Non-Final Office Action on U.S. Appl. No. 14/497,280, dated Sep. 22, 2016, 15 pages.
Non-Final Office Action on U.S. Appl. No. 14/820,237, dated Aug. 5, 2016, 14 pages.
Non-Final Office Action on U.S. Appl. No. 15/005,507, dated Nov. 22, 2016, 7 pages.
Non-Final Office Action on U.S. Appl. No. 13/250,858, dated Mar. 18, 2016, 20 pages.
Notice of Allowance on U.S. Appl. No. 13/432,662, dated Feb. 18, 2016, 10 pages.
Notice of Allowance on U.S. Appl. No. 13/892,026, dated Jul. 18, 2016, 10 pages.
Notice of Allowance on U.S. Appl. No. 13/892,057, dated Nov. 8, 2016, 10 pages.
Notice of Allowance on U.S. Appl. No. 14/814,020, dated Aug. 12, 2016, 15 pages.
Notice of Allowance on U.S. Appl. No. 14/820,237, dated Jan. 23, 2017, 10 pages.
Notice of Reasons for Rejection for Japanese Application No. 2015-509120, dated Nov. 1, 2016, 4 pages.
Final Office Action for U.S. Appl. No. 14/754,368 dated Sep. 22, 2017. 15 pages.
Final Office Action on U.S. Appl. No. 14/152,756, dated Jun. 7, 2017, 16 pages.
Non-Final Office Action for U.S. Appl. No. 14/754,368 dated Jan. 24, 2018. 15 pages.
Non-Final Office Action for U.S. Appl. No. 15/136,841 dated Jul. 13, 2017. 36 pages.
Non-Final Office Action on U.S. Appl. No. 14/754,368, dated May 8, 2017, 12 pages.
Notice of Allowance for U.S. Appl. No. 15/005,507 dated May 23, 2017. 8 pages.
First Office Action for CN Patent Application No. 201610500335.9 dated Sep. 19, 2019. 7 pages.
Notice of Allowance for U.S. Appl. No. 14/754,368 dated Jun. 21, 2018. 13 pages.

\* cited by examiner

HEAD UP DISPLAY FOR INTEGRATING VIEWS OF CONFORMALLY MAPPED SYMBOLS AND A FIXED IMAGE SOURCE

CROSS REFERENCE TO RELATED APPLICATIONS

The present application is related to U.S. application Ser. Nos. 14/225,062 and 14/754,368, both assigned to the Assignees of the present application and incorporated herein by reference in their entireties.

BACKGROUND

Displays are used in various applications. For example, avionic and other vehicular systems use head down display (HDD) systems and head up display (HUD) systems including but not limited to wearable displays, such as, head worn displays (HWD) and helmet mounted display (HMD). In aircraft applications, HUD and HDD systems advantageously display information from aircraft systems and sensors in a graphical and alphanumeric format. The information can also or alternatively include computer generated graphics based upon a terrain and structure database and/or real time sensor captured images.

HUDs generally include combiners that provide information conformally with the view of the environment through the windshield. For example, the F35 Joint Strike Fighter (JSF) includes a visor-type combiner and precision head tracking HUD for the pilot that allows the pilot to effectively view a full sphere, limited only by the flexibility of the seated pilot. Certain images provided by HUDS can suffer from degraded image quality in certain lighting situations. The degraded image quality can make it difficult to view detailed information. For example, a white symbol superimposed over a cloud and a green symbol superimposed over green landscape are difficult to perceive and/or ascertain. Further, information, such as lists or other text, is often more easily viewed on HDDs, such as, large area displays (LADs) or large area HDDs (LAHDDs), than HUDs.

SUMMARY

In one aspect, the inventive concepts disclosed herein are directed to an apparatus in an environment. The environment includes a head down image source disposed at an image source position. The apparatus includes a processor, a projector, and a combiner configured to provide an image from the projector. The processor is configured to cause the projector to provide the image having a window conformally mapped to the image source position.

In another aspect, the inventive concepts disclosed herein are directed to a head up display for integrating views of conformally mapped symbols and a first image on at least one image source in an environment. The head up display includes a computer and a combiner configured to provide a second image in response to the computer. The second image includes the conformally mapped symbols and a window for viewing the first image on the image source.

In still another aspect, the inventive concepts disclosed herein are directed to a method of providing a virtual display in an environment. The method includes providing a first image to a combiner. The first image has a window for viewing an in-dash display. The method also includes providing a second image on the in-dash display

BRIEF DESCRIPTION OF THE DRAWINGS

The disclosure will become more fully understood from the following detailed description, taken in conjunction with the accompanying drawings, wherein like reference numerals denote like components, and.

DETAILED DESCRIPTION OF THE EXEMPLARY EMBODIMENTS

Before describing in detail the particular improved system and method, it should be observed that the inventive concepts include, but are not limited to, a novel structural combination of conventional data/signal processing, displays, optical components and/or communications circuits, and not in the particular detailed configurations thereof. Accordingly, the structure, methods, functions, control and arrangement of various components, optics, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to some exemplary embodiments, a display system provides a window for viewing a head down display (HDD), other display, gauge or sensor. In some embodiments, the image on a combiner of a head up display (HUD) includes one or more transparent windows at one of more virtual locations associated with the actual location of the HDD, other display, gauge or sensor. In some embodiments, the transparent windows (e.g., regions free of overlays provided by the HUD) allow information on the HDDs, displays, gauges or sensor to be viewed without interference from the symbols or images displayed on the combiner. The display system allows sensed (from an enhanced vision system (EVS)) and generated (from a synthetic vision system (SVS)) real-world features and/or representative icons to be displayed to the flight crew in conjunction with HUD operations and yet does not interfere with views of the cockpit instrumentation and HDDs. Advantageously, the system and method of some embodiments allows information more easily viewed on the HDDs to be viewed without clutter from information provided on the combiner of the HUD, thereby providing an integrated user interface to unify the information presented on a HUD overlay and HDDs.

In some embodiments, the system and method utilizes a processor in communication with a worn display (e.g., a head mounted display (HMD)) and HDDs. Various information or symbols can be provided in the HUD image and moved to the HDD by using gestures or signals from user interfaces. For example, a grab and hold gesture can be used to move airspeed information, altitude tape information, an airspace boundary overlay, airport data, and/or communication data from the HUD view to a view on the HDD. Other gestures can be used to select information from menus or page through information screens on the HDD in some embodiments.

Figure 1:
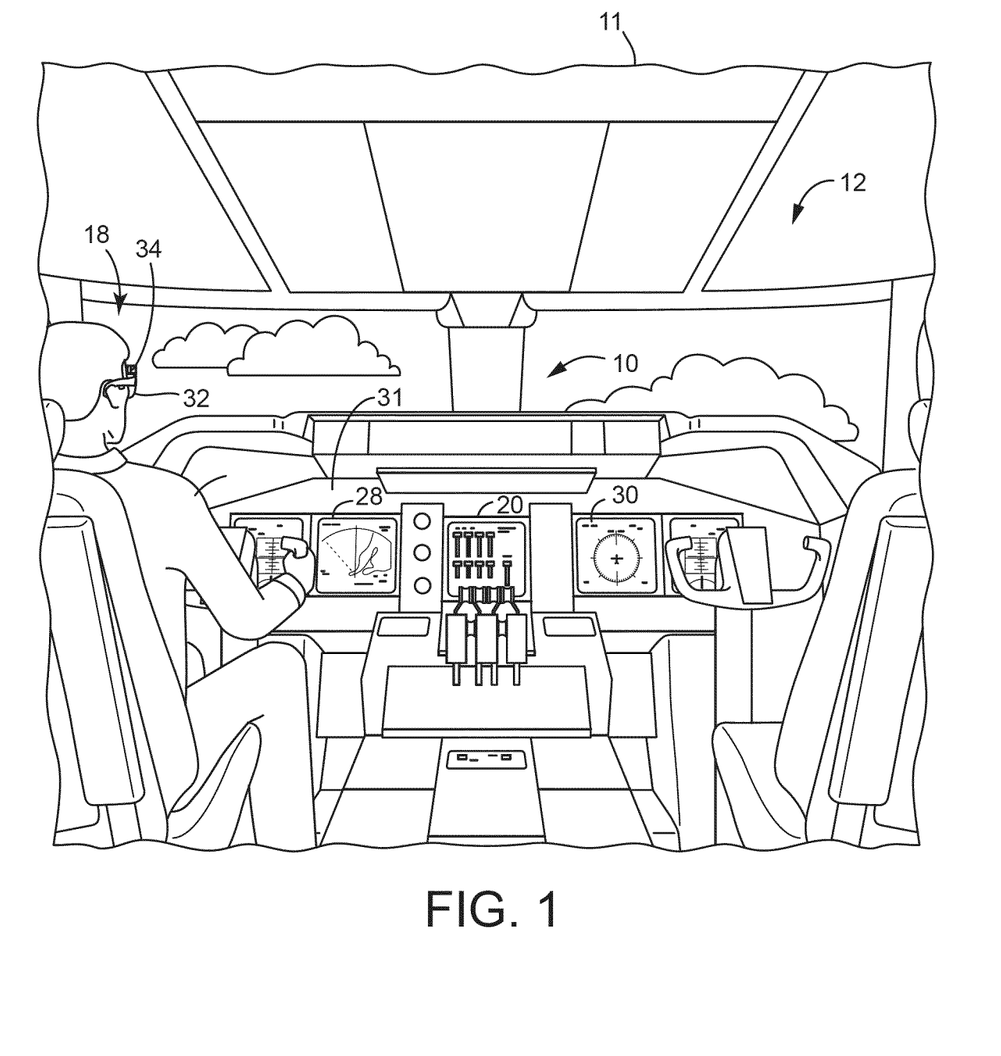
FIG. 1 is a perspective view schematic illustration of an aircraft control center or cockpit including a display system having a combiner according to some embodiments.

With reference to FIG. 1, a display system 10 is provided for an aircraft 11 including a cockpit or an aircraft control center 12. Although discussed with respect to the aircraft 11, the display system 10 can be utilized in a variety of applications including but not limited to other transportation applications (e.g. ground vehicle, marine, space, etc.), robotic or drone applications, medical applications, or targeting applications according to some embodiments. In some embodiments, the display system 10 is configured for use in smaller cockpit embodiments, for use in remote vehicle or aircraft applications, for use in ships or boats, or for use in simulators or other training devices. The display system 10 can provide two dimensional or three dimensional virtual images in some embodiments.

The display system 10 includes one or more of a HUD 18 and one or more of a HDD 20, a HDD 28, and a HDD 30 provided below a glare shield 31. The HDDs 20, 28 and 30 and the HUD 18 can be used to provide information to the flight crew, thereby increasing visual range and enhancing decision-making abilities. The HUD 18 includes a combiner 32 and a projector 34. The HDDs 28 and 30 are large area format HDDs in some embodiments.

In some embodiments, the HDDs 20, 28 and 30 and the combiner 32 provide images associated with weather displays, weather radar displays, communication displays, flight data displays, engine instrument information displays, chart displays, mapping displays, flight plan displays, terrain displays, or other flight instrumentation. Further, the HDDs 20, 28 and 30 and the combiner 32 provide a synthetic vision system (SVS) image, an enhanced vision system (EVS) image (e.g., an EFVS image), a radar image, a sensor image or a merged or combined image derived from any two or more of the SVS image, the radar image, the sensor image, and the EVS image in some embodiments. The HDDs 20, 28 and 30 and the combiner 32 are configured to display a three dimensional or perspective image of terrain and/or weather information in some embodiments. Other views of terrain and/or weather information can also be provided (e.g., plan view, horizontal view, vertical view, or combinations thereof).

The HDDs 20, 28 and 30 and the combiner 32 can be implemented using any of a variety of display technologies, including cathode ray tube (CRT), liquid crystal display (LCD), organic LED display, laser-based, and other display technology. The combiner 32 can be any type of device for providing conformal images, including but not limited to, waveguide combiners, reflective combiners, or holographic combiners, in some embodiments. The combiner 32 is embodied as a head worn combiner or a fixed HUD combiner in some embodiments. In some embodiments, the combiner 32 utilizes waveguide optics and diffraction gratings to receive collimated light provided by the projector 34 and provide collimated light to a user. In some embodiments, the combiner 32 is a goggle, glasses, helmet or visor-type combiner.

In some embodiment, the HUD 18 is a head worn display system (e.g., an HMD) with head and/or eye tracking. The HUD 18 utilizes the projector 34 to provide the image to the combiner 32 including at least one virtual region corresponding to the locations of the HDDs 20, 28, and 30 and/or gauges, instrumentation, or other equipment in the flight control center 12.

Figure 2:
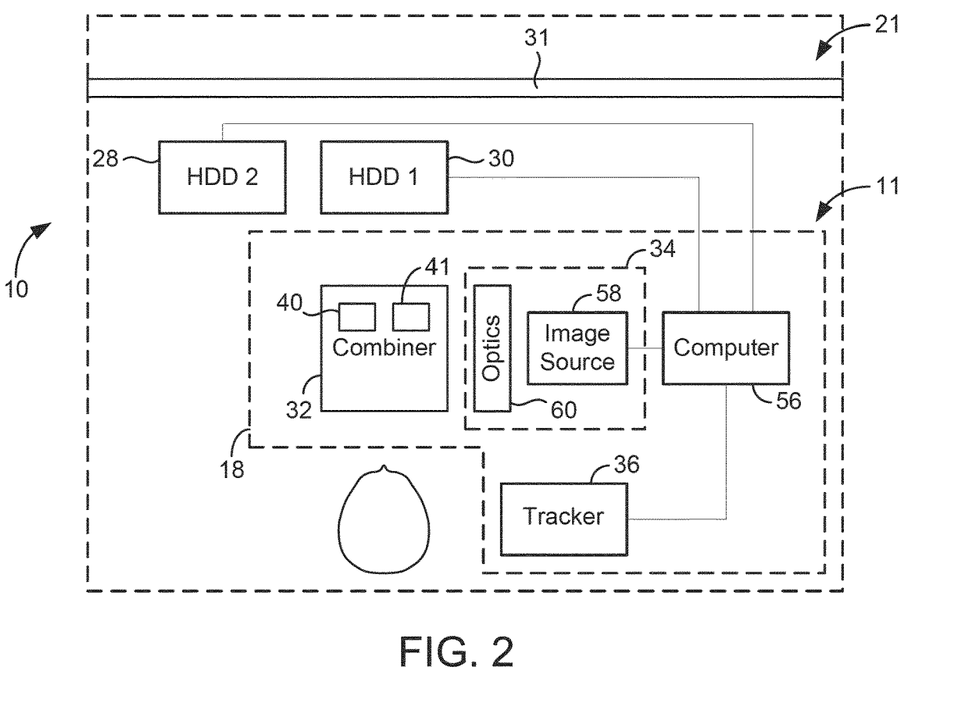
FIG. 2 is a schematic general block diagram of the display system illustrated in FIG. 1 according to some embodiments.

With reference to FIG. 2, the HUD 18 includes the combiner 32, the projector 34, a tracker 36, and a processor or computer 56. The projector 34 includes an image source 58 and optics 60. The display system 10 provides a window 40 on the combiner 32 at a virtual location associated with the HDD 28 in some embodiments. In some embodiments, the display system 10 provides a window 41 on the combiner 32 at a virtual location associated with the HDD 30 in some embodiments. Other windows associated with HDD 20 (FIG. 1), instrumentation, controls or gauges can be provided on the combiner 32 in some embodiments.

The tracker 36 is a head or eye tracker. In some embodiments, the tracker 36 provides gaze information associated with the user (e.g., pilot) to the computer 56 in one embodiment. The tracker 36 can be any type of sensor or set of sensors for determining head positon and/or eye positon including but not limited to camera based sensors, magnetic sensors, mechanical sensors, infrared sensors, etc. In some embodiments, the tracker 36 can be or include one or more cameras or sensors to provide gaze information. The cameras can be fixed with in the aircraft control center 12 (FIG. 1) or worn by the user for determining the content of the user's visual field (e.g., gaze information). In some embodiments, the camera associated with the tracker 36 can utilize marks within the aircraft control center 12 to determine where the user is looking. Spatial registry software can be utilized with data from the camera to locate the view of a user in some embodiments.

In operation, the HUD 18 provides images from the image source 58 via the optics 60 to a pilot or other operator so that he or she can simultaneously view the images and the real world scene on the combiner 32 in some embodiments. The images can include graphic and/or text information (e.g., flight path vector, target icons, symbols, fuel indicators, course deviation indicator, or pitch indicator). The image can also include information from other sensors or equipment (e.g., a vertical traffic collision avoidance display, terrain avoidance and awareness display, a weather radar display, flight control sensors, an electronic flight bag, a navigation system, and environmental sensors) in some embodiments. In addition, the images can include synthetic or enhanced vision images. In some embodiments, collimated light representing the image from image source 58 is provided on the combiner 32 so that the pilot can view the image conformally on the real world scene through the combiner 32 with the virtual windows 40 and 41 for viewing the HDDs 28 and 30. The virtual windows 40 and 41 do not include information on the combiner 32 and appear as a transparent region in some embodiments.

The computer 56 can use gaze information, eye position and/or head position from the tracker 36 to determine the user's field of view and appropriately place the windows 40 and 41 as well as conformal symbols in some embodiments. In some embodiments, the user can select information on the image provided on the combiner 32 to be viewed on the HDDs 28 and 30 through windows 40 and 41. Advantageously, HUD 18 allows seamless integration of information displayed on the HDDs 28 and 30 and the combiner 32 using the windows 40 and 41 in some embodiments.

In some embodiments, monochromatic symbols and information are provided on the combiner 32 while colored symbols and colored information are provided on the HDDs 28 and 30 and viewed through the windows 40 and 41. Weather radar information, terrain avoidance system information, and traffic collision avoidance systems information including colored symbology is provided on the HDDs 28 and 30 in some embodiments. Textual listings are provided on the HDDs 28 and 30 in some embodiments.

The image source 58 can be or include any type of devices for providing an image including but not limited to a CRT display, an LED display, an active matrix liquid crystal display (LCD), a light emitting diode, laser illuminator, etc. In one embodiment, image source 58 can be a micro LCD assembly or liquid crystal on silicon (LCOS) display and can provide linearly polarized light. Image source 58 can include a laser or LED backlight in one embodiment.

The computer 56 can be a HUD computer or HWD computer and controls the provision of images by the image source 58. The computer 56 can be a processing circuit or part of a processing circuit associated with other electronic components in the aircraft control center 12 (FIG. 1). The computer 56 can receive data from various sensors, equipment of aircraft 11 (FIG. 1). The computer 56 includes software or instructions stored on a non-transitory medium such as a memory in some embodiments. The software includes gesture recognition software, HUD function software, spatial registry software and video processing software in some embodiments.

The optics 60 are collimating optics which can be a single optical component, such as a lens, or include multiple optical components, in some embodiments. The optics 60 are integrated with the image source 58 in some embodiments. The optics 60 are separate or partially separate from the image source 58 in some embodiments.

Figure 3:
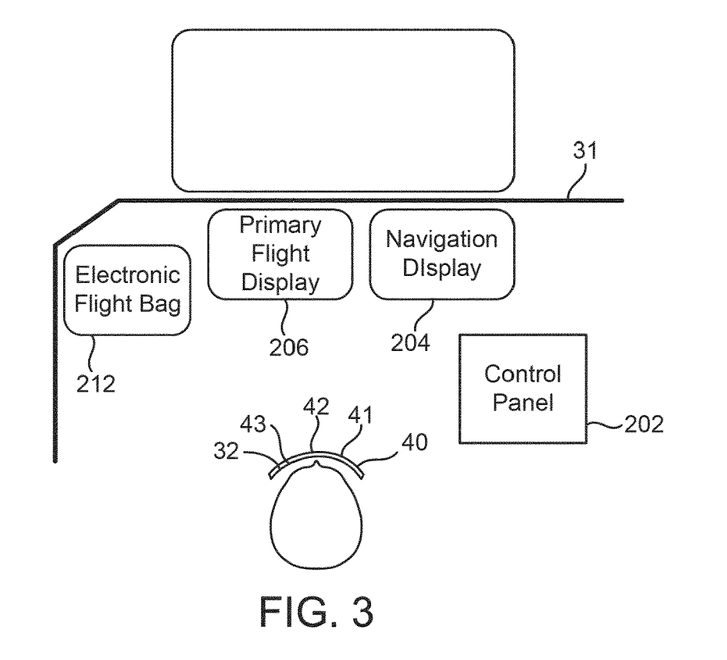
FIG. 3 is a schematic general block diagram of the display system illustrated in FIG. 1 showing images on one or more HDDs viewed through the combiner of the display system according to some embodiments.

With reference to FIG. 3, the display system 10 allows a control panel 202, a navigation display panel 204, a primary flight display panel 206, and an electronic flight bag display panel 212 to be viewed through respective windows 40, 41, 42, and 43. The control panel 202, navigation display panel 204, primary flight display panel 206, and electronic flight bag display panel 212 are each provided on a single HDD or on a part of an HDD (e.g., HDDs 28 and 30 (FIG. 2)) in some embodiments. In some embodiments, the control panel 202, navigation display panel 204, primary flight display panel 206, and electronic flight bag display panel 212 are provided on a single large panel HDD or a pair of HDDs. When the pilot turns or rotates head or gaze position to view information on the combiner 32, the computer 56 (FIG. 2) adjusts the positions of the windows 40, 41, 42, and 43 to match the position of the control panel 202 and the display panels 204, 206 and 212 in some embodiments.

The user can view information through a window 43 on the combiner 32 associated with primary flight display panel 206 in some embodiments. The user can view information on combiner 32 associated with the electronic flight bag display panel 212 through the window 43 in some embodiments. The user can view information on combiner 32 associated with the navigation display panel 204 through the window 41 in some embodiments. Although only three display panels 204, 206, and 212 are shown in FIG. 3, more image sources and windows can be provided. Display panels 212, 204, and 206 are images in a fixed place below the glare shield 31 in some embodiments.

Figure 4:
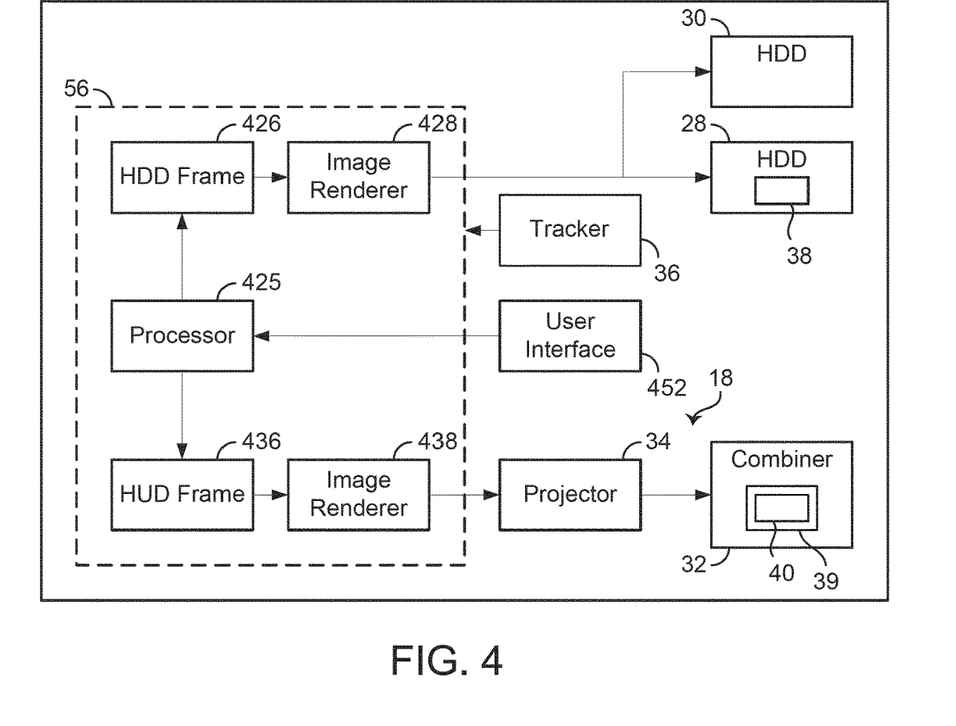
FIG. 4 is a more detailed, schematic general block diagram of the display system illustrated in FIG. 1 according to some embodiments.

With reference to FIG. 4, the display system 10 is configured to coordinate the viewing of information on at least one of HDDs 28 and 30 and the combiner 32 in some embodiments. The HDD 28 includes an image 38 which can be viewed through the window 40 in an image 39 provided on the combiner 32 in some embodiments. Information associated with the image 38 can be selected and placed in the window 40 via a user interface 452. Once placed in the window 40, the HDD 28 can augment the information with additional information and symbols provided in the image 38 on the HDD 28. The user interface 452 includes sensors (e.g., optical) for sensing hand motions and moving data in response to the hand motions. The computer 56 can execute gesture recognition algorithms to determine the gestures sensed via a camera associated with the user interface 452. In some embodiments, the user interface 452 includes a mouse, track ball, joy stick, touch pad or other interface device for selecting and moving data via a cursor, pointer or other graphic. The image 38 can include flight instrumentation information, compasses, navigation flight and hazard information.

The image 39 is an image including flight control symbols and/or other HUD symbology with or without a vision system image or SVS image provided conformally on the combiner 32 in some embodiments. In some embodiments, the image 39 does not include flight control symbols and/or other HUD symbology and includes a vision system image and/or a SVS image. The window 40 has a clear background for viewing information on the HDD 28 in some embodiments.

The computer 56 includes a processor 425, an HDD frame module 426, an image renderer 428, a HUD frame module 436, and an image renderer 438 in some embodiments. The processor 125 is coupled to the projector 34 and is coupled to the HDDs 28 and 30 in some embodiments. In some embodiments, the display system 10 receives a synthetic vision frame from a synthetic vision system (SVS) and/or a vision frame from a vision system (VS). The processor 425 serves to provide a conformal image on the combiner 32 and select the information to be on display on the HDDs 28 and 30 in some embodiments.

The image renderer 428 utilizes display information from the HDD frame module 426 to provide an image on the HDDs 28 and 30. The image renderer 428 can be utilized to provide any type of flight information. The HUD frame module 436 provides information (e.g., HUD symbology) to the image renderer 438 for providing the image 39 on the combiner 32 on the combiner 32. The image renderer 438 uses data from the tracker 36 to provide the window 40.

The image renderers 428 and 438 can be hardware components or hardware components executing software configured to provide the images 38 and 39 in some embodiments. The frame modules 426 and 436 include memory such as a frame buffer.

The processor 425 can be part of or integrated with a radar system, the SVS, the VS, a HDD display computer for the HDDs 20, 28, and 30, or a HUD computer for the projector 34 in some embodiments. In some embodiments, the processor 425 is an independent platform.

The display system 10 also includes a data link receiver or data bus for receiving information from one or more of flight management computers and other avionic equipment for receiving phase of flight indications in some embodiments. Phase of flight indications are used to automatically choose information for displaying on HDDs 28 and 30 and the combiner 32 at landing, approach, cruise or take off in some embodiments. For example, the window 40 can automatically be removed or provided in response to a phase of flight such as landing. In some embodiments, certain information (e.g., airport information, enhanced vision information, traffic collision avoidance information or terrain avoidance information) is automatically provided in image 38 during the landing phase of flight. In another example, an airport moving map can be viewable through the window 40 (e.g., virtual window) on the HDD 28 when taxiing. In some embodiments, flight plan information automatically appears in the window 40 during cruise, and the window 40 is removed during landing or flight (e.g., altitude, roll, pitch, yaw, air speed, vertical speed indications) and position parameters are provided in the window 40 during landing.

Figure 5:
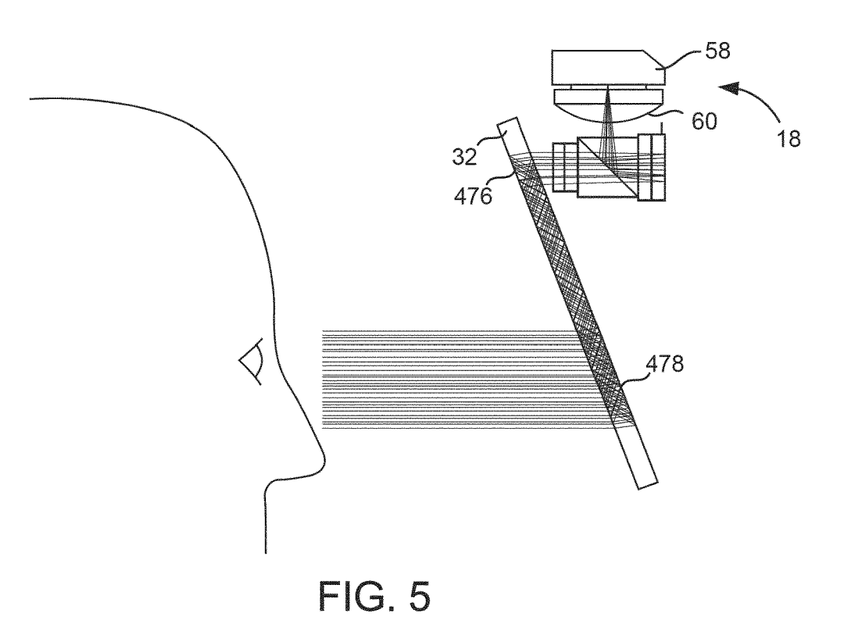
FIG. 5 is a simplified side view drawing of the combiner and a projector for the display system illustrated in FIG. 1 according to some embodiments.

With reference to FIG. 5, the HUD 18 includes the combiner 32 and the projector 34. The projector 34 includes the image source 58 and the optics 60. The image source 58 includes a backlit liquid crystal display module including a transmissive AMLCD display The optics 60 provides collimated light to the combiner 32 (e.g., collimation via a catadioptric folded collimator in one embodiment). Generally, the collimated light input to the combiner 32 has a small dimension in a vertical direction allowing a compact design. The combiner 32 includes a diffractive grating 476 for coupling light into the waveguide associated with combiner 32 and a diffractive grating 478 that ejects light out of combiner 32 to the user. The gratings 476 and 478 are configured for pupil expansion. The image source 58 and combiner 32 can be attached to a ceiling of the cockpit or a bulkhead wall or can be worn in some embodiments.

Figure 6:
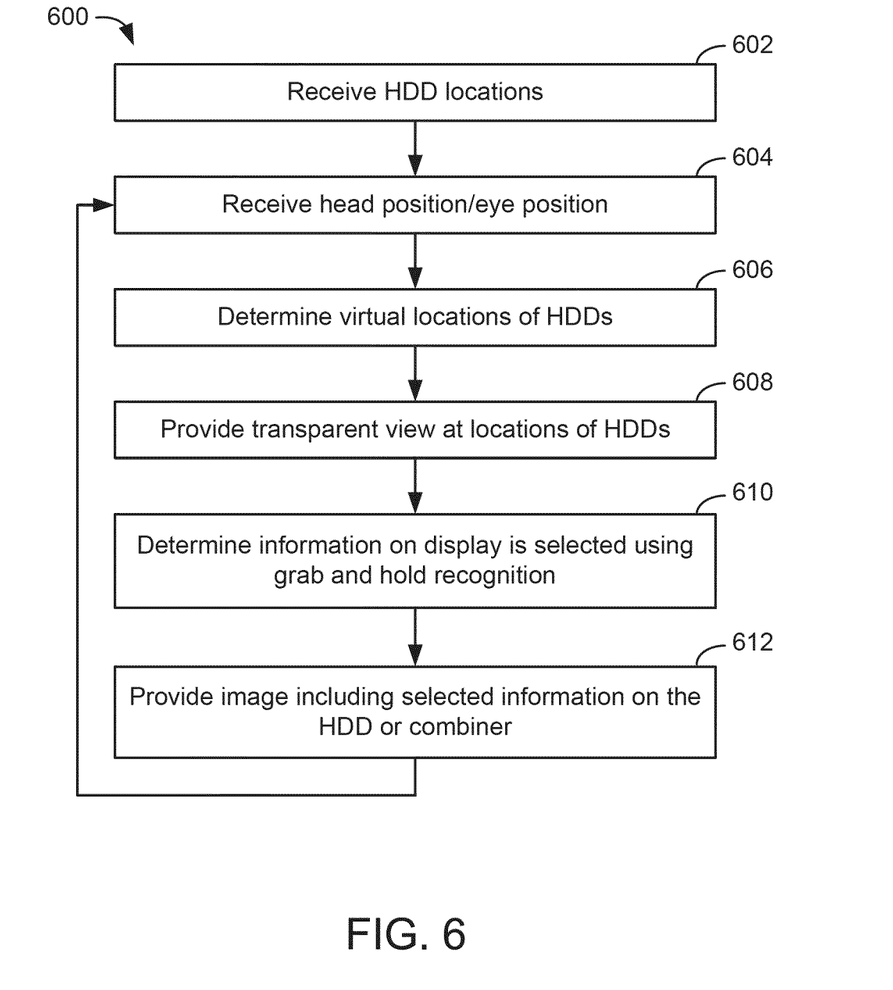
FIG. 6 is a flow diagram showing operations of the display system illustrated in FIG. 1 according to some embodiments.

With reference to FIG. 6, the display system 10 operates according to a flow 600. The flow 600 can be performed by the computer 56 (FIG. 4) executing the software or instructions according to various embodiments. In some embodiments, the computer 56 receives the position of the HDDs 28 and 30 which can be stored in memory at an operation 602. In some embodiments, the computer 56 receives a head position or eye position at an operation 604. At an operation 606, the virtual location of the HDDs 28 and 30 is determined using the gaze information. At an operation 608, information is displayed on the combiner 32 including windows 40 and 41 for viewing the HDDs 28 and 30 in some embodiments.

At an operation 610, the computer 56 determines if information has been selected for movement from the combiner 32 to the HDDs 28 and 30, from the HDDs 28 and 30 to the combiner 32, or between the HDDs 28 and 30. Grab and hold gestures can be used to virtually move the information from locations on the combiner 32 and the HDDs 28 and 30 in some embodiments. In some embodiments, cursors, pointers or other symbols are manipulated using user interface devices, such as track balls, mouse devices, buttons, joy sticks, or touch panels, associated with the user interface 452 to select and move the information.

At an operation 612, the information is moved according to the gesture or selection in the operation 610. The flow 600 can be advantageously used to use windows 40 and 41 as drop zone for information that is displayed on the combiner 32 but can be displayed with a higher image quality on the HDDs 28 and 30. In addition, the information can augmented with data more appropriately displayed on the HDDs 28 and 30 when dropped into the windows 40 and 41 in some embodiments.

Figure 7:
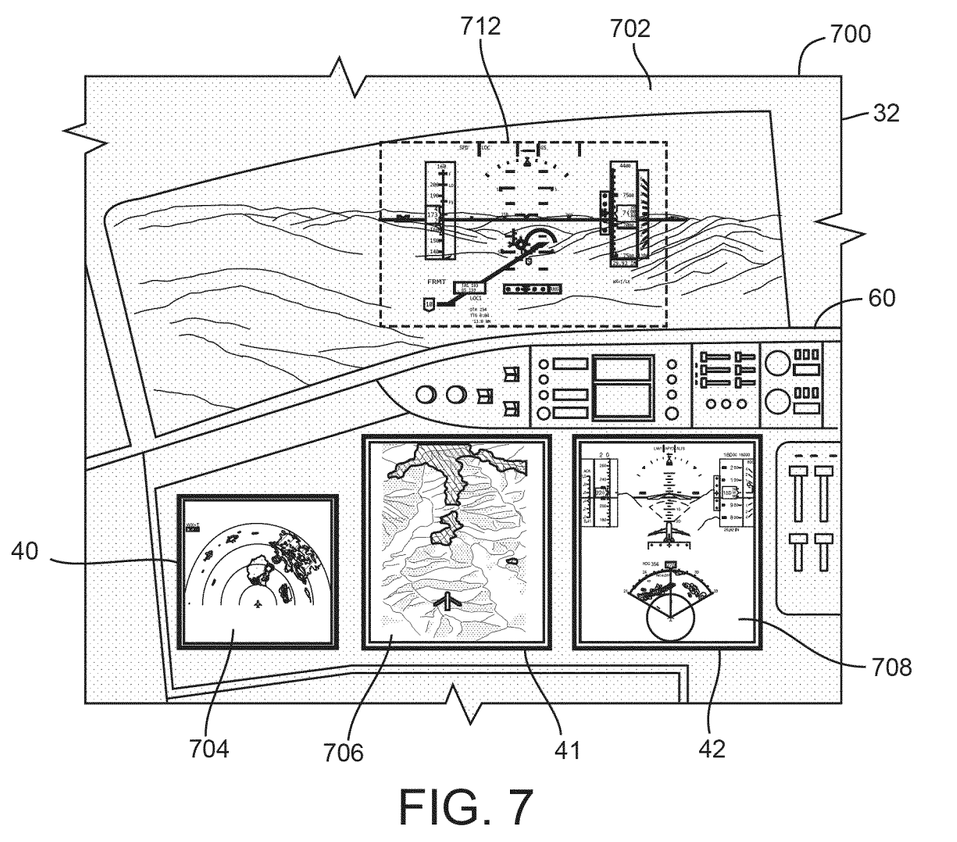
FIG. 7 is a schematic illustration showing an image on the combiner of the display system illustrated in FIG. 1 according to some embodiments.

With reference to FIG. 7, the display system 10 provides an image 702 on the combiner 32. The image 702 includes windows 40, 41, and 42 associated with the location of display panels 704, 706 and 708. The display panel 704 is a weather radar display image in some embodiments. The display panel 706 is an EVS or VS display image in some embodiments. The display panel 708 is primary flight display image in some embodiments. The combiner 32 also provides image 712 including conformal flight data.

Any types of symbols can be displayed in the windows 40, 41, and 42 and as part of the image 712. The symbols include airspeed and altitude tape. The symbols can be abstract and represent that more information is available when moved to the windows 40, 41, and 42 in some embodiments. For example, pages of information related to airports associated with an airspace boundary symbol is provided in one or more of windows 40, 41, and 42 when selected on the image 712 or at any location on the combiner 32. The information includes radio frequencies, instrument, approaches, runway length, runway width, elevation, and available services in some embodiments.

Figure 8A:
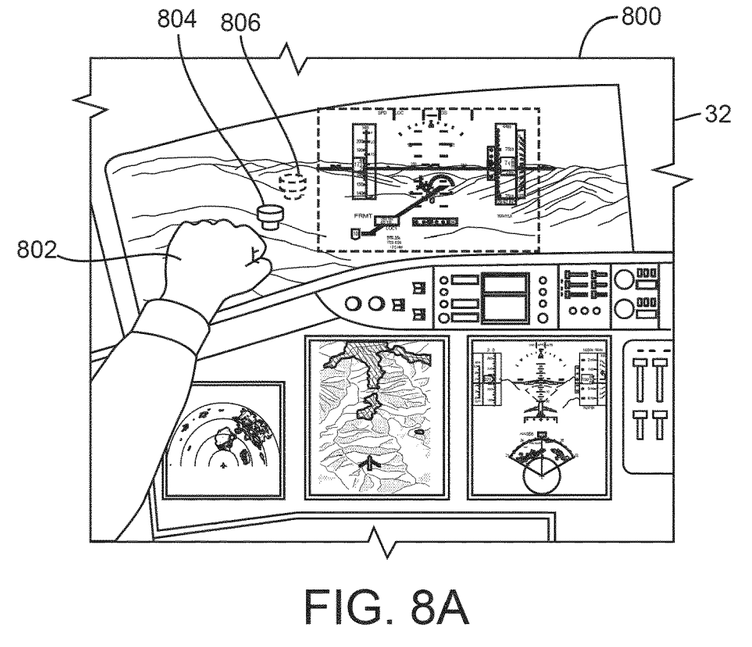
FIGS. 8A-B are schematic illustrations of a grab and hold operation as viewed from the combiner of the display system illustrated in FIG. 1 according to some embodiments.
Figure 8B:
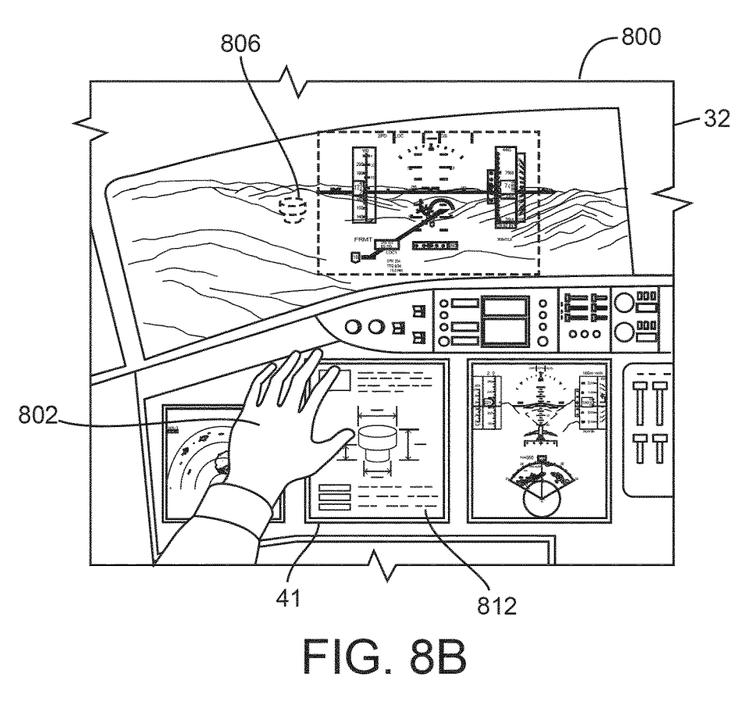

With reference to FIGS. 8A-B, the display system 10 responds to a grab and hold gesture associated with an operator's hand 802. The hand 802 virtually grabs an airspace boundary symbol 806 in some embodiments. When grabbed, the airspace boundary symbol 806 is copied and moved as airspace boundary symbol 804 to the window 41 (FIG. 8B). Once moved and released in the window 41, an HDD (e.g. HDD 28) provides information associated with the airspace boundary symbol 806 as a display panel 812. Once moved, the airspace boundary symbol 806 is removed from the combiner 32 in some embodiments. In some embodiments, the airspace boundary symbol 806 remains until specifically selected for removal by a delete gesture.

Although discussed above with respect to the air space boundary symbol 806, other symbols can be moved to the window 41 and additional information associated with the symbol can be provided in the window 41 when moved. In some embodiments, information can be removed from display panel 812 and placed on the combiner 32 outside of window 41 in response to the grab and hold gesture. Information in the window 41 can be placed in another window by the grab and hold gesture.

In some embodiments, the display system 10 can recognize gestures for paging through menus associated with information in the windows 40, 41, and 42. The user can quickly change pages with a swipe gesture in some embodiments. In some embodiments, the grab and hold gesture could be used to drop information in an HDD associated with a co-pilot for the co-pilot's review. Moving a navigation overlay from the combiner 32 to a window 40 can trigger a moving map page to be displayed on the HDDs 28 and 30 or on the combiner 32 in some embodiments. In some embodiments, virtual controls are provided on the combiner 32 and gestures are used to manipulate the virtual controls. In some embodiments, virtual handles adjacent radio equipment or throttle controls could pull up a tuning page or engine monitoring page on the HDDs 28 and 30 (FIG. 2) or the combiner 32. In some embodiments, the symbol representing an item that can be dragged and dropped can glow, be highlighted, flash slowly, etc. For example, am throttle symbol can glow and be dragged and drop to provide bar graphs representing engine characteristics. According to other examples, a glowing radio symbol or a glowing engine symbol can be dragged and dropped to obtain radio or engine data. In another example, a passenger or cabin symbol is dragged and dropped to display and control cabin information from the HDD 28 or 30. The cabin information includes no smoking indications, seatbelt indications, and electronics usage indications in some embodiments.

Although exemplary embodiments are described with respect to cockpit environments, the display technology described herein can be utilized in other environments. While the detailed drawings, specific examples, detailed algorithms, and particular configurations given describe preferred and exemplary embodiments, they serve the purpose of illustration only. The inventive concepts disclosed herein are not limited to the specific forms shown. For example, the methods may be performed in any of a variety of sequence of steps or according to any of a variety of computer sequences. The hardware and software configurations shown and described may differ depending on the chosen performance characteristics and physical characteristics of the image and processing devices. For example, the type of system components and their interconnections may differ. The systems and methods depicted and described are not limited to the precise details and conditions disclosed. The flow charts show exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A head up display for integrating views of conformally mapped symbols, the head up display comprising:
   a display configured to provide a first image in an environment, the display having a screen at a location in the environment;
   a computer; and
   a combiner configured to provide a second image in response to the computer, the second image comprising the conformally mapped symbols, the second image having a window for viewing the first image, wherein the window has a virtual location matching the location of the screen.

2. The head up display of claim 1, wherein the first image is comprised of primary flight data and the combiner receives light from a real world scene.

3. The head up display of claim 1, wherein the first image further comprises at least one additional window associated with a location of another image source.

4. The head up display of claim 1, wherein the combiner is a near eye fixed waveguide combiner or a helmet mounted combiner.

5. The head up display of claim 1, further comprising:
   a head tracking device, wherein the first image is provided in accordance with a head position and wherein the virtual location of the window continues to match the location of the screen when the head position is changed.

6. The head up display of claim 1, further comprising:
   a user interface configured to sense a gesture and where the computer is configured to provide information in the window in response to the gesture.

7. The head up display of claim 1, wherein the display is a large panel display image source.

8. A method for use with a head up display for integrating views of conformally mapped symbols in an environment, the head up display comprising a display for providing a first image, a computer, and a combiner for providing a second image in response to the computer, the display having a screen at a location in the environment, the method comprising providing the conformally mapped symbols in the second image, the conformally mapped symbols being mapped to features in the environment; and
providing a window in the second image for viewing the first image, wherein the window has a virtual location matching the location of the screen.

9. The method of claim 8, wherein the first image is comprised of primary flight data and the combiner receives light from a real world scene.

10. The method of claim 8, wherein the first image further comprises at least one additional window associated with a location of another image source.

11. The method of claim 8, wherein the combiner is a near eye fixed waveguide combiner, a head worn display or a helmet mounted combiner, and the window is free of the conformally mapped symbols.

12. The method of claim 8, further comprising:
   a head tracking device, wherein the first image is provided in accordance with a head position and wherein the virtual location of the window continues to match the location of the screen when the head position is changed.

13. The method of claim 8, further comprising:
   a user interface configured to sense a gesture and where the computer is configured to provide information in the window in response to the gesture.

14. The method of claim 8, wherein the display is a large panel display image source.

15. A head up display for integrating views of conformally mapped symbols in an environment and allowing a first image to be seen, the first image being provided by a head down display having a screen at a location in the environment, the head up display comprising:
   a computer; and
   a combiner for providing a second image in response to the computer, wherein the conformally mapped symbols are provided in the second image, the conformally mapped symbols being mapped to features in the environment, wherein a window is provided in the second image for viewing the first image, wherein the window has a virtual location matching the location of the screen.

16. The head up display of claim 15, wherein the first image is comprised of primary flight data and the combiner receives light from a real world scene, wherein the conformally mapped symbols are virtually provided through a windshield in the environment.

17. The head up display of claim 15, wherein the first image further comprises at least one additional window associated with a location of another image source.

18. The head up display of claim 15, wherein the combiner is a near eye fixed waveguide combiner, a head worn display or a helmet mounted combiner.

19. The head up display of claim 15, further comprising:
   a head tracking device, wherein the first image is provided in accordance with a head position and wherein the virtual location of the window continues to match the location of the screen when the head position is changed.

20. The head up display of claim 15, further comprising:
   a user interface configured to sense a gesture and where the computer is configured to provide information in the window in response to the gesture.

* * * * *